United States Patent [19]

Hodge

[11] 4,148,808

[45] Apr. 10, 1979

[54] METHOD FOR REDUCING ZEARALENONE

[75] Inventor: Edward B. Hodge, Terre Haute, Ind.

[73] Assignee: International Minerals & Chemical Corp., Libertyville, Ill.

[21] Appl. No.: 606,856

[22] Filed: Aug. 22, 1975

[51] Int. Cl.$^2$ .......................................... C07D 313/00
[52] U.S. Cl. .............................................. 260/343.41
[58] Field of Search ..................... 260/343.2 F, 343.41

[56] References Cited

U.S. PATENT DOCUMENTS

| | | | |
|---|---|---|---|
| 3,239,345 | 3/1966 | Hodge | 260/343.2 F |
| 3,687,982 | 8/1972 | Young | 260/343.2 F |
| 3,960,898 | 6/1976 | Hodge | 260/343.2 F |

Primary Examiner—Paul J. Killos
Attorney, Agent, or Firm—Bernard & Brown

[57] ABSTRACT

Zearalenone, or a derivative thereof, is heated in the presence of isopropyl alcohol and Raney nickel catalyst to reduce it to zearalanol, or its corresponding derivative.

24 Claims, No Drawings

METHOD FOR REDUCING ZEARALENONE

This invention relates to a method for reducing zearalenone, or its derivatives to zearalanol, or its corresponding derivatives. In another aspect, the invention relates to a method for reducing zearalenone, or its derivatives, to a mixture of a major amount of the high melting diastereoisomer of zearalanol (e.g. greater than about 50% by wt.) and a minor amount of the low melting diastereoisomer of zearalanol (e.g. less than about 50% by wt.), or the corresponding derivatives thereof.

The compounds which may be reduced by the method of this invention (hereinafter sometimes referred to as zearalenone compounds) may be represented by the following structural formula:

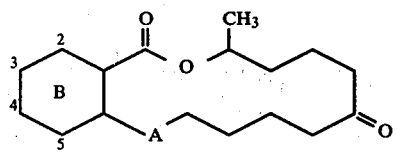

wherein A is a single bond, or a double bond and B is a saturated or unsaturated carbon ring, including aromatic ring, and has, as substituents, one or more members selected from the group consisting of hydrogen, hydroxy, alkoxy, alkanoyloxy, monocyclic aryloxy, and monocyclic arylalkoxy.

The substituents on the B ring are preferably hydrogen, hydroxy, lower alkoxy, e.g., alkoxy containing 1 to about 6 carbon atoms such as methoxy, ethoxy, propoxy, pentoxy, and the like; lower alkanoyloxy, e.g. alkanoyloxy containing 1 to about 6 carbon atoms such as formyloxy, acetoxy, butyroyloxy and the like; monocyclic aryloxy of from 6 to 8 carbon atoms such as phenyloxy, tolyloxy, etc.; or monocyclic arylalkoxy, that is an alkoxy group having an aryl substituent thereon, wherein the alkoxy group has 1 to about 5 carbon atoms and the aryl substituent has about 6 to 8 carbon atoms and the aryl substituent has about 6 to 8 carbon atoms such as benzyloxy, tolyl methoxy, and the like. The 3 to 5 positions of the B ring can be hydrogen; although, halogen groups, e.g., chloro and bromo, may be substituents at these positions.

The zearalenone compounds may be prepared from zearalenone which has the following structure:

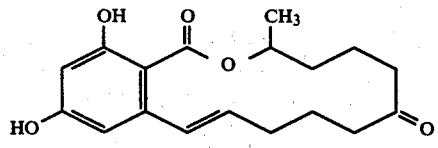

Zearalenone is a fermentation product resulting from the cultivation of a zearalenone-producing strain of the microorganism *Gibberella zeae* on a suitable nutrient medium. The production of zearalenone is described in U.S. Pat. No. 3,196,019 issued to Andrews, F. N., et al on July 20, 1965.

Reduction of the olefinic bond and the ketone group of zearalenone compounds yields compounds represented by the following structure (hereinafter sometimes referred to as zearalanol compounds):

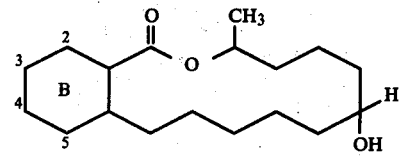

wherein the B ring may be saturated or unsaturated and may be substituted as described above. The compounds exhibit estrogenic and anabolic activity and are useful as anabolic substances for administration to certain meat producing animals.

Zearalanol compounds can exist in two diastereoisomeric forms. The two diastereoisomeric forms differ somewhat in physical and chemical characteristics and in biological activity. In a particular reduction product of the present invention, zearalanol (in which the B ring is aromatic and is substituted with hydroxyl groups in the 2 and 4 positions), one diastereoisomeric form has a higher melting point than the other and is considered the preferred form for administration to animals.

The method of the present invention generally provides a product containing a major amount of the high melting diastereoisomer and a minor amount of the low melting diastereoisomer of zearalanol or derivatives thereof.

In accordance with the invention, there is disclosed a method for reducing a zearalenone compound to a zearalanol compound, comprising heating a reaction mixture which includes the zearalenone compound, reducing amounts of isopropyl alcohol and catalytic amounts of Raney nickel to a temperature sufficiently high and for a time sufficient to effect the reduction.

The reduction method of the present invention is initiated by dissolving or suspending a zearalenone compound in isopropyl alcohol in the presence of a nickel catalyst, generally a finely divided nickel catalyst known as Raney nickel. The concentration of the zearalenone compound in the isopropyl alcohol mmay be at any convenient level which does not exceed the reducing capacity of the isopropyl alcohol. Generally these concentrations are from about 0.1 grams per 100 ml. to about 20 grams per 100 ml. of isopropyl alcohol, preferably from about 3 grams to about 8 or about 12 grams per 100 ml.

The Raney nickel catalyst is employed in amounts sufficient to effect the reduction. The amounts of catalyst generally range from about 0.1 gram to about 2.5 grams per gram of zearalenone compound, preferably from about 0.2 grams to about 1.1 grams per gram of zearalenone compound. Amounts of catalyst less than 0.1 gram per gram of zearalenone compound are generally ineffective and amounts greater than about 2.5 grams per gram of zearalenone compound may result in undesired side reactions, such as reduction of aromatic portions of the compound.

The reduction reaction is generally carried out under reducing conditions, which include a temperature sufficiently high and a reaction time sufficiently long to produce the zearalanol compound.

The reaction time required for substantial reduction to occur is largely determined by the reaction temperature. The reduction is advantageously accomplished at elevated temperatures, e.g. generally ranging from about 20° C. to about 200° C., preferably from about 60° C. to about 130° C., a particularly preferred reduction temperature being from about 70° C. to 80° C. Reductions which are carried out at lower temperatures, e.g. from about 20° C. to the boiling point of the reaction mixture, are usually conducted at about atmospheric pressure, and generally require a reaction time of at least about 2 hours for the reduction to occur. Substantially quantitative reduction has usually occurred when the mixture has reacted for about 30 hours. The preferred reaction time when such lower temperatures and pressures are used is about 15 to 28 hours.

Shorter reaction times are required when the reduction reaction is conducted at higher temperatures, e.g. from about 100° C. to about 200° C. Such reactions are conducted in suitable sealed vessels capable of withstanding higher temperatures and the pressures which result from the increased vapor pressures of the contents of the vessels, e.g. pressures up to about 500 pounds per square inch. Suitable vessels are autoclaves or bomb type reactors. When the reaction is conducted in sealed vessels, the presence of oxygen in the vessel may be hazardous. Accordingly, the vessel is preferably flushed with a suitable, nnon-oxidizing gas, for example hydrogen or nitrogen, prior to sealing it. Generally, for a reaction temperature of about 100° C. to about 125° C., a reaction time of from about 15 minutes to about 10 hours, preferably about one to three hours is adequate to effect a substantial conversion of zearalenone to zearalanol.

The reduction method of the present invention has been found to involve a unique equilibrium which favors the formation of the high melting diastereoisomer of zearalanol compounds. The equilibrium reaction will be illustrated by the reduction of zearalenone to zearalanol, and the oxidation of the zearalanol so formed to zearalanone; however, derivatives of zearalenone, as hereinbefore described, may also by so reduced, in which case, the corresponding derivatives of zearalenol and zearalanone (hereinafter sometimes called zearalanone compounds) will be formed. The reduction of zearalenone with isopropyl alcohol may be represented as follows:

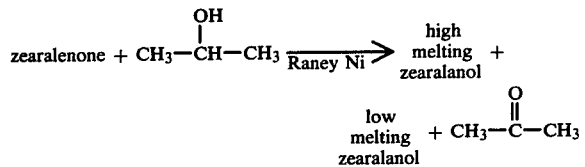

The acetone formed during the reaction can react with either diastereoisomer of zearalanol to form zearalanone which is represented by the following chemical structural formula

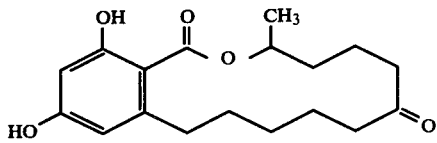

Indeed, if the reaction is allowed to proceed in the presence of acetone (for instance, if the acetone is not removed during the course of the reaction), then zearalanone is found in the reaction mixture.

In a reaction mixture containing isopropyl alcohol, acetone, both diastereoisomers of zearalanol, and zearalanone, the reactants and products are in equilibrium. The equilibrium reaction may be represented as follows:

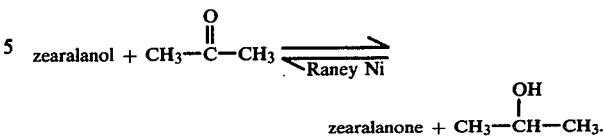

Relatively high concentrations of acetone and low concentrations of isopropyl alcohol cause the equilibrium to shift to the right whereas relatively low concentrations of acetone and high concentrations of isopropyl alcohol cause the equilibrium to shift to the left.

With regard to this equilibrium reaction, it has been surprisingly found that the rate of reaction of the low melting diastereoisomer of zearalanol to zearalanone is greater than the rate of same reaction for the high melting diastereoisomer of zearalanol. Since the zearalanone so formed can be reduced again to the two diastereoisomers of zearalanol by reaction with isopropyl alcohol, a comparatively high ratio of high melting diastereoisomer to low melting diastereoisomer may be attained by conducting the reaction for a suitable time, and in the presence of acetone in a concentration sufficient to cause significant oxidation of zearalanol to zearalanone, e.g. from about 5% to about 50% of the zearalanol being oxidized to zearalanone. To carry out such a reaction, acetone may be added to the reaction mixture at a concentration of about 0.1% by vol. to about 30% by vol., preferably about 5% by vol. to about 10% by vol. The acetone may be added at the beginning of the reduction reaction, but is preferably added after substantially all of the zearalenone has been reduced, e.g. after about 2 to about 10 hours. Alternatively, the reaction may be conducted for a sufficiently long period of time to allow the acetone resulting from the reaction to accumulate. The latter stages of the reduction reaction are advantageously conducted with a minimal amount of acetone present, so that the relative concentration of isopropyl alcohol is high, thus rendering the conditions favorable to substantially quantitative reduction of any zearalenone present to a mixture of the diastereoisomers of zearalanol. For this reason, the acetone is preferably removed during at least the latter stages of the reduction reaction, e.g. by distillation.

The preferred method of conducting the reduction method of the present invention is by refluxing a suitable reaction mixture for about 10 hours to about 30 hours followed by slowly distilling for about 5 to about 20 hours, or, alternatively by slowly distilling for about 15 hours to about 30 hours, preferably about 20 to 28 hours. If the refluxing period is not followed by a slow distillation the reduction product may contain up to about 20% by wt. zearalanone. When such a distillation is employed, the amount of zearalenone present in the product will vary with the distillation conditions, but generally will range from about 1% to about 15%.

The amount of zearalanone in products resulting from reductions is sealed vessels will vary with the particular reaction conditions employed, however, it will generally be relatively high since substantial amounts of acetone remain in the reaction mixture.

The remaining zearalanone, or its derivatives, which are present in a reduction product may be further reduced to zearalanol compounds by conventional reduction techniques. For example, to further reduce zearalanone products of reductions in sealed vessels, the vessel may be charged with hydrogen gas to an elevated pressure, e.g. from about 200 to about 1000 pounds per square inch, and heated, e.g. to a temperature of from about 50° C. to about 200° C. for a sufficient time to effect the reduction, e.g. from 1 to about 5 hours. Another method by which most of the remaining zearalanone or its derivatives which are present in products resulting from reductions either at atmospheric pressure or in sealed vessels may be further reduced to zearalanol compounds comprises reacting the reduction product with a borohydride, e.g. an alkali metal borohydride, preferably sodium borohydride. This step is usually accomplished by removing the Raney nickel catalyst from a reduction product mixture, thus leaving a solution of both diastereoisomers of a zearalanol compound and a zearalanone compound in isopropyl alcohol and possibly some acetone. For convenience, the solution may be concentrated, e.g. by evaporating the solvent, to about one-tenth to about three-fourths, preferably about one-fourth to one-half of the original volume. The borohydride is added to the mixture at a concentration sufficient to reduce the zearalonone compound, e.g. about 0.01 g to about 0.1 per gram of zearalenone compound originally reduced, preferably about 0.02 g to about 0.05 g per gram of zearalenone compound. This mixture is agitated for a time sufficient to allow the reduction of substantially all of the zearalanone compound present, e.g. from about 10 min. to about 2 hours or more, preferably about 20 to 40 min., and the resulting zearalanol compound is recovered by any suitable method.

A convenient method for recovering the zearalanol compound from any of the reaction mixtures resulting from the reduction method of the present invention comprises removing the catalyst from the solution, e.g. by filtration, diluting the solution with water to a volume of about 2 to about 10 times, preferably 4 to 5 times the initial volume, adjusting the pH of the aqueous mixture to about 3 to about 7 with a suitable mineral acid, e.g. sulfuric acid or hydrochloric acid, thus causing substantially quantitative precipitation of the zearalanol compound, and separating the precipitated zearalanol compound from its mother liquor by any suitable method, such as filtration.

The present invention provides a method for reducing a zearalenone compound to a zearalanol compound utilizing common production equipment and readily accessible starting materials. Zearalanol compounds produced by this reductive method generally have a ratio of high melting diastereoisomer to low melting diastereoisomer of about 60:40 to about 70:30 and in the preferred embodiment usually contains less than about 5% or 6% by wt. zearalanone compounds.

The following examples serve to further illustrate the present invention but the invention is not intended to be limited thereby.

EXAMPLES I–VIII

A series of experiments was conducted in which zearalenone was heated in isopropyl alcohol at atmospheric pressure in the presence of Raney nickel (in water). The experiments were conducted by dissolving zearalenone in isopropyl alcohol, adding Raney nickel (in water), and heating the mixture. The amounts and conditions of the reaction are indicated in Table I. The product was recovered by removing the Raney nickel catalyst by filtration, diluting the filtrate with an approximately equal volume of water, thereby precipitating the product, and separating the product by filtration. The composition of the product is given in Table I.

EXAMPLES IX–XIII

A series of experiments was conducted in which zearalenone was heated in isopropyl alcohol at elevated pressures in a hydrogen atmosphere and in the presence of Raney nickel (in water). The experiments were conducted in rocking bomb reaction vessels. Zearalenone, isopropyl alcohol, Raney nickel (in water), and, in some cases, acetone were introduced into the bomb in the amounts indicated in Table II. The bomb was flushed with hydrogen, sealed, and heated to the temperature and for the time indicated in Table II. The vessel was then pressurized to 500 p.s.i. with hydrogen gas and was maintained at 80° C. for three hours. The product was recovered in the manner described in Examples I–VIII. The composition of the product is given in Table II.

EXAMPLES XIV–XXI

A series of experiments was conducted in which zearalenone was heated in isopropyl alcohol at elevated pressures in a nitrogen atmosphere and in the presence of Raney nickel (in water). The experiments were conducted in thermostatically controlled stainless steel vessels having means for stirring. Zearalenone, isopropyl alcohol, Raney nickel (in water), and, in some cases, acetone were introduced into the vessel in the amounts indicated in Table III. The vessel was flushed with nitrogen, sealed, stirred, and heated to the temperature and for the time indicated in Table III. The product was recovered in the manner described in Examples I–VIII. The composition of the product is given in Table III.

EXAMPLE XXII

Zearalenone, 50.0 g, and Raney nickel (in water), 17 g, were heated in 600 ml. of isopropyl alcohol for 24 hours while acetone was slowly distilled from the mixture. The solution was concentrated to about 200 ml. by evaporation. Sodium borohydride, 1.0 g was added to the concentrated solution and the mixture was stirred for thirty minutes. The mixture was diluted with about 900 ml. of water and the pH was adjusted to 5.3 with dilute (6N) sulfuric acid. The product, which was recovered by filtration, analyzed 62% by wt. high melting zearalanol and 38% by wt. low melting zearalanol.

EXAMPLES XXIII–XXVII

A series of experiments is conducted in which a zearalenone compound of the formula

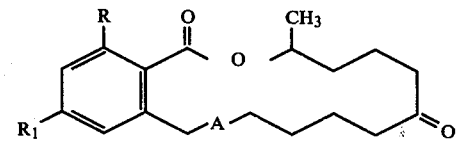

is heated in isopropyl alcohol at atmospheric pressure in the presence of Raney nickel (in water). The experiments are conducted by dissolving the zearalenone compound (25 g) in isopropyl alcohol, (300 ml.), adding Raney nickel (10 g), and refluxing the mixture for 20 hours followed by a slow distillation of about 10 hours. The product is recovered as described in Examples I–VIII. The zearalenone compound in each experiment is satisfactorily reduced to the corresponding zearalanol compound. The substituents of the compounds are shown in Table IV.

TABLE I

| Example | Zearalenone (g) | Isopropyl Alcohol (ml) | RaNi (g) | Conditions | | Product Wt. (g) | High Melting Zearalanol (Wt. %) | Low Melting Zearalanol (Wt. %) | Zearalanone (Wt. %) |
|---|---|---|---|---|---|---|---|---|---|
| I | 25 | 300 | 12 | Dist.* | 12 hr. | 23.4 | 57 | 31 | 12 |
| II | 25 | 300 | 10 | Refl.** Dist. | 16 hr. 8 hr. | 22.7 | 62 | 32 | 6 |
| III | 25 | 300 | 7 | Dist. | 23 hr. | 23.8 | 59 | 33 | 8 |
| IV | 50 | 500 | 17 | Dist.27 | ½ hr. | 45.5 | 60 | 38 | 2 |
| V | 50 | 500 | 17 | Dist. | 35 hr. | 46.5 | 64 | 34 | 2 |
| VI | 50 | 500 | 17 | Dist. | 40 hr. | 44.5 | 65 | 34 | 1 |
| VII | 5 | 100 | 5 | Refl. | 4 hr. | 3.9 | 61 | 30 | 9 |
| VIII | 5 | 100 | 2.5 | Refl. | 24 hr. | 4.5 | 53 | 28 | 18 |

*Slow distillation.
**Reflux.

TABLE II

| Example | Zearalenone (g) | Solvent (ml) | RaNi (g) | Time/Temp. | Product Wt. (g) | High Melting Zearalanol (Wt. %) | Low Melting Zearalanol (Wt. %) | Zearalanone (Wt. %) |
|---|---|---|---|---|---|---|---|---|
| IX | 30 | 600 Isopropyl Alcohol(I.P.) | 15 | 3 hr. 110° C. | 27 | 65 | 35 | — |
| X | 50 | 600 I.P. | 25 | 3 hr. 110° C. | 46 | 64 | 36 | — |
| XI | 30 | 600 I.P. | 15 | 3 hr. 120° C. | 29 | 62 | 38 | — |
| XII | 50 | 600 I.P. | 25 | 2 hr. 120° C. | 47 | 61 | 39 | — |
| XIII | 50 | 600 ml I.P. 50 ml Acetone | 25 | 2 hr. 125° C. | 47 | 63 | 37 | — |

TABLE III

| Example | Zearalenone (g) | Solvent (ml) | RaNi (g) | Conditions | Product Wt. (g) | High Melting Zearalanol (Wt. %) | Low Melting Zearalanol (Wt. %) | Zearalanone (Wt. %) |
|---|---|---|---|---|---|---|---|---|
| XIV | 50 | 500 I.P. Alc. | 17 | 6 hr. 100° C. | 46 | 50 | 30 | 20 |
| XV | 50 | 500 I.P. Alc. | 17 | 2¼ hr. 115° C. | 48 | 48 | 30 | 22 |
| XVI | 50 | 500 I.P. Alc. | 17 | 4 hr. 115° C. | 46 | 50 | 28 | 22 |
| XVII | 50 | 500 I.P. Alc. | 17 | 2 hr. 125° C. | 45 | 51 | 30 | 19 |
| XVIII | 50 | 500 I.P. Alc. 25 Acetone | 17 | 6 hr. 115° C. | 47 | 48 | 21 | 31 |
| XIX | 50 | 500 I.P. Alc. 12.5 Acetone | 17 | 3 hr. 120° C. | 47 | 50 | 25 | 25 |
| XX | 50 | 500 I.P. Alc. 25 Acetone | 17 | 4 hr. 125° C. | 47 | 47 | 23 | 30 |
| XXI | 50 | 500 I.P. Alc. 25 Acetone | 17 | 3 hr. 130° C. | 46 | 47 | 23 | 30 |

TABLE IV

| Example | R | R₁ | A |
|---|---|---|---|
| XXIII | —H | H | single bond |
| XXIV | —OH | H | single bond |
| XXV | —OCH₃ | —OCH₃ | double bond |
| XXVI | —O—C(=O)—CH₃ | —O—C(=O)—CH₃ | double bond |
| XXVII | —O—CH₂—C₆H₅ | —OH | double bond |

I claim:

1. A method for reducing a zearalenone compound of the formula

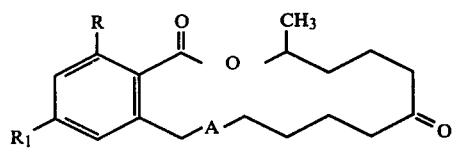

to a zearalanol compound of the formula

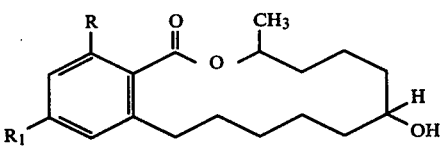

wherein A is a single bond or a double bond, and R and R₁ may be the same as or different from each other and are each selected from the group consisting of hydrogen, hydroxy, lower alkoxy of from 1 to about 6 carbon atoms, alkanoyloxy of from 1 to about 6 carbon atoms, and arylalkoxy, wherein the alkoxy portion has 1 to about 5 carbon atoms and the aryl portion has about 6 to 8 carbon atoms, which comprises heating a reaction mixture which includes an admixture of the zearalenone compound and reducing amounts of isopropyl alcohol, and catalytic amounts of Raney nickel, under reducing conditions, including a temperature sufficiently high and a reaction time sufficiently long to produce the zearalanol compound.

2. The method of claim 1 wherein the reducing conditions include a temperature of from about 20° C. to about 200° C.

3. The method of claim 1 wherein the reducing conditions include a temperature of from about 20° C. to about the boiling point of the reaction mixture and a reaction time of about 2 hours to about 30 hours.

4. The method of claim 1 wherein the reducing conditions include a temperature of about 100° C. to about 200° C., and a reaction time of about 15 minutes to about 10 hours.

5. The method of claim 2 wherein the concentration of the zearalenone compound in the reaction mixture is from about 0.01 gram to about 20 grams per 100 ml. of isopropyl alcohol and the Raney nickel catalyst is present in an amount of from about 0.01 gram to about 2.5 grams per gram of zearalenone compound.

6. The method of claim 2 wherein the concentration of the zearalenone compound in the reaction mixture is from about 3 grams to about 8 grams per 100 ml. of isopropyl alcohol and the Raney nickel is present in an amount of from about 0.2 gram to about 1.1 gram per gram of zearalenone compound.

7. The method of claim 1 further comprising, removing the Raney nickel catalyst from the reaction mixture after the reduction has been substantially completed, thus leaving a catalyst-free solution of both diastereoisomers of zearalanol compound and zearalanone compound in isopropyl alcohol and possibly acetone; adding a borohydride to the catalyst-free solution in an amount sufficient to reduce the zearalanone compound to a zearalanol compound; and agitating the solution for a time sufficient to effect substantially complete reduction of the zearalanone compound.

8. The method of claim 7 wherein the borohydride is an alkali metal borohydride and the borohydride is added to the catalyst-free solution at a concentration of from about 0.01 g to 0.1 g per gram of zearalenone compound originally reduced.

9. The method of claim 7 wherein the catalyst-free solution is concentrated to about one-tenth to three-fourths of its volume by evaporation prior to adding the borohydride; the borohydride is sodium borohydride; and the borohydride is added to the catalyst-free solution at a concentration of from about 0.02 g to about 0.05 g per gram of zearalenone compound originally reduced.

10. The method of claim 7 wherein said zearalenone compound is zearalenone and further comprising recovering the zearalanol compound.

11. The method of claim 2 wherein the reaction mixture contains high-melting and low-melting diastereoisomers of the zearalanol compound and further includes acetone at a concentration sufficient to cause significant oxidation of the zearalanol compound to a zearalanone compound of the formula

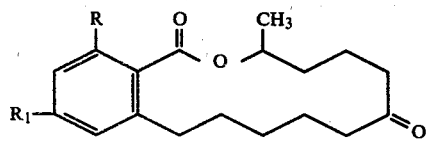

wherein R and R$_1$ are defined as in claim 1 and wherein the rate of reaction of the low-melting diastereoisomer to the zearalanone compound is greater than the rate of reaction for the high-melting diastereoisomer.

12. The method of claim 11 wherein the acetone is present in the reaction mixture at a concentration of about 0.1% to about 30% by volume.

13. The method of claim 11 wherein the acetone is present in the reaction mixture at a concentration of about 5% to about 10% by volume.

14. The method of claim 11 wherein acetone is added to the reaction mixture after substantially all of the zearalenone compound has been reduced to the zearalanol compound.

15. The method of claim 11 which further comprises removing substantially all of the acetone from the reaction mixture by distillation after a significant amount of the zearalanol compound has been oxidized to the zearalanone compound, thereby causing the reduction of the zearalanone compound thus produced to a mixture of the high melting diastereoisomer of a zearalanol compound and the low melting diastereoisomer of a zearalanol compound and a trace of zearalanone compound.

16. The method of claim 15 wherein the acetone is removed from the reaction mixture after from about 10 hours to about 30 hours heating by slowly distilling for about 5 hours to about 20 hours.

17. The method of claim 15 further comprising, removing the Raney nickel catalyst from the reaction mixture after the reduction has been substantially completed, thus leaving a catalyst-free solution of both diastereoisomers of zearalanol compound and zearalanone compound in isopropyl alcohol and possibly acetone; adding a borohydride to the catalyst-free solution in an amount sufficient to reduce the zearalanone compound to a zearalanol compound; and agitating the solution for a time sufficient to effect substantially complete reduction of the zearalanone compound.

18. The method of claim 17 wherein the borohydride is an alkali metal borohydride and the borohydride is added to the catalyst-free solution at a concentration of from about 0.01 g to 0.1 g per gram of zearalenone compound originally reduced.

19. The method of claim 17 wherein the catalyst-free solution is concentrated to about one-tenth to three-fourths of its volume by evaporation prior to adding the borohydride; the borohydride is sodium borohydride; and the borohydride is added to the catalyst-free solution at a concentration of from about 0.02 g to about 0.05 g per gram of zearalenone compound originally reduced.

20. The method of claim 1 wherein said zearalenone compound is zearalenone and further comprising recovering the zearalanol compound.

21. The method of claim 15 wherein said zearalenone compound is zearalenone and further comprising recovering the zearalanol compound.

22. The method of claim 17 wherein said zearalenone compound is zearalenone and further comprising recovering the zearalanol compound.

23. A method for reducing a zearalenone compound of the formula

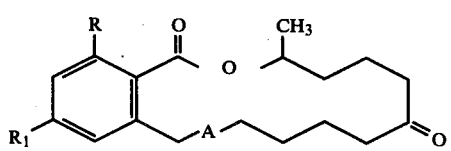

to a zearalanol compound of the formula

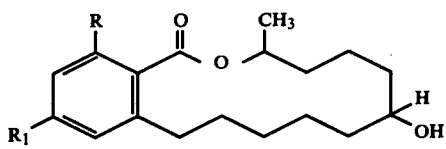

wherein A is a single bond or a double bond, and R and R₁ may be the same as or different from each other and are each selected from the group consisting of hydrogen, hydroxy, lower alkoxy of from 1 to about 6 carbon atoms, alkanoyloxy of from 1 to about 6 carbon atoms, and arylalkoxy, wherein the alkoxy portion has 1 to about 5 carbon atoms and the aryl portion has about 6 to 8 carbon atoms, which comprises heating a reaction mixture which includes the zearalenone compound, reducing amounts of a reducing agent consisting essentially of isopropyl alcohol, and catalytic amounts of Raney nickel, under reducing conditions, including a temperature sufficiently high and a reaction time sufficiently long to produce the zearalanol compound.

24. A method for reducing a zearalenone compound of the formula

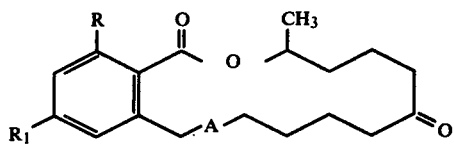

to a zearalanol compound of the formula

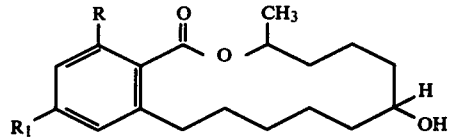

wherein A is a single bond or a double bond, and R and R₁ may be the same as or different from each other and are each selected from the group consisting of hydrogen, hydroxy, lower alkoxy of from 1 to about 6 carbon atoms, alkanoyloxy of from 1 to about 6 carbon atoms, and arylalkoxy, wherein the alkoxy portion has 1 to about 5 carbon atoms and the aryl portion has about 6 to 8 carbon atoms, which comprises heating a reaction mixture which includes the zearalenone compound and isopropyl alcohol wherein the zearalenone compound in the reaction mixture is from about 0.01 gram to about 20 grams per 100 ml. of isopropyl alcohol, and catalytic amounts of Raney nickel, under reducing conditions, including a temperature sufficiently high and a reaction time sufficiently long to produce the zearalanol compound.

* * * * *